United States Patent [19]

Higgins

[11] Patent Number: 4,961,507
[45] Date of Patent: Oct. 9, 1990

[54] DISPENSING SYSTEM FOR HANDLING CONSUMABLE TOOLING AND SUPPLIES

[76] Inventor: Larry G. Higgins, 400 Keller Ave., Bartonville, Ill. 61607

[21] Appl. No.: 267,678

[22] Filed: Nov. 3, 1988

Related U.S. Application Data

[63] Continuation of Ser. No. 932,930, Nov. 19, 1986, abandoned, which is a continuation-in-part of Ser. No. 756,340, Jul. 17, 1985, abandoned.

[51] Int. Cl.$^5$ .................... G07F 11/00; G06F 7/08
[52] U.S. Cl. .................... 221/129; 194/904; 235/381; 364/479
[58] Field of Search ............ 221/1, 2, 9, 13, 104, 221/129, 258, 268; 186/35, 36, 37, 55, 56; 235/379, 380, 381, 382, 383, 385; 340/825.3, 825.31, 825.33, 825.34, 825.35; 194/205, 210, 904; 364/403, 478, 479

[56] References Cited

U.S. PATENT DOCUMENTS

| | | | |
|---|---|---|---|
| 3,036,731 | 5/1962 | Cozart | 221/258 X |
| 3,653,541 | 4/1972 | Crum | 221/268 X |
| 3,786,421 | 1/1974 | Wostl et al. | 235/381 |
| 3,933,231 | 1/1976 | Vinet | 194/904 X |
| 4,120,452 | 10/1978 | Kimura et al. | 364/479 X |
| 4,267,942 | 5/1981 | Wick, Jr. et al. | 221/2 |
| 4,284,208 | 8/1981 | Levasseur | 221/129 |
| 4,300,040 | 11/1981 | Gould et al. | 235/381 |
| 4,354,613 | 10/1982 | Desai et al. | 364/479 X |
| 4,412,292 | 10/1983 | Sedam et al. | 221/9 X |
| 4,414,467 | 11/1983 | Gould et al. | 235/381 |
| 4,519,522 | 5/1985 | McElwee | 221/13 |
| 4,553,211 | 11/1985 | Kawasaki et al. | 364/479 |
| 4,604,557 | 8/1986 | Cowles | 340/825.35 X |

Primary Examiner—Kevin P. Shaver
Attorney, Agent, or Firm—Willian Brinks Olds Hofer Gilson & Lione

[57] ABSTRACT

The invention is a system for dispensing and tracking the use of a plurality of different and discrete consumable items. A dispensing machine is provided which has a supply of the various items to be dispensed arranged in a selected pattern. A program and a memory are in the system to receive and identify data on the user of the machine and the item to be dispensed. The system responds to a request for an item by verifying the authority of the user, generating confirmation of the availability of the requested item, and executing the dispensing of the requested item. The system also generates recordable data regarding the dispensing operation to control the ordering, inventorying and tracking of the dispensed items. A printer can generate a hard copy of the data. Pneumatic matrix switching is also provided to control the selection and dispensing of the consumable items by the system.

18 Claims, 8 Drawing Sheets

FIG. 6
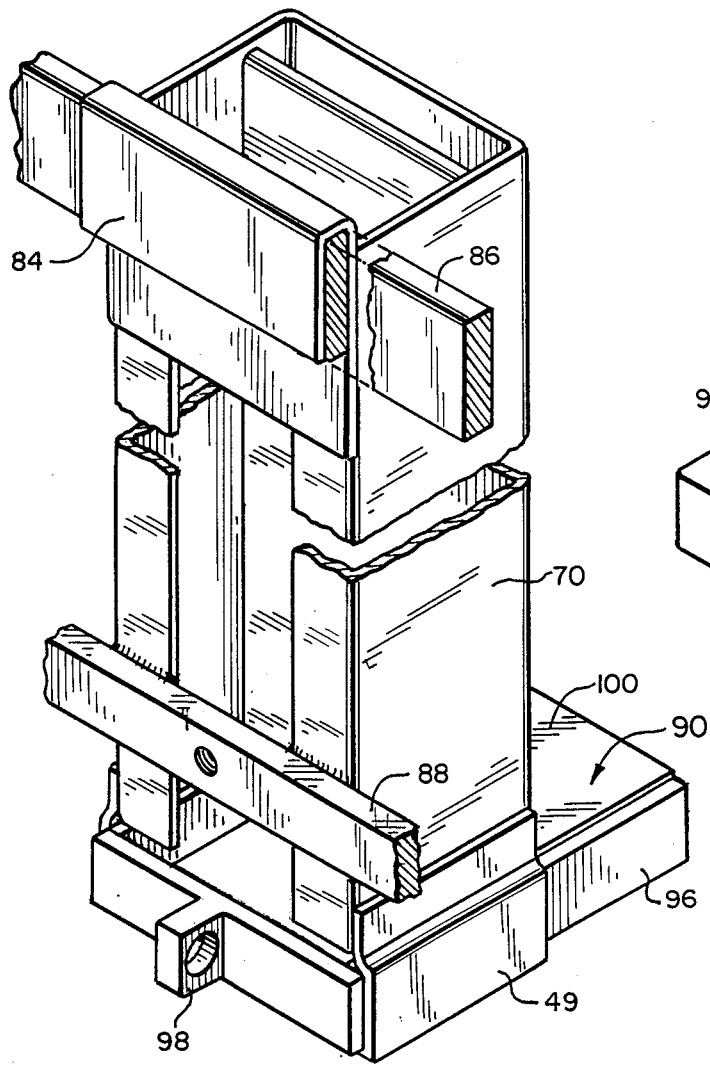
FIG. 7
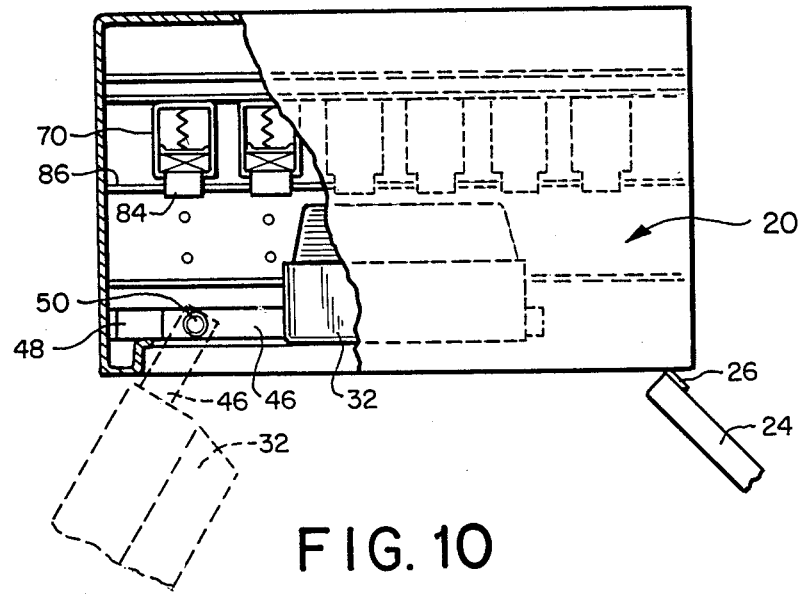
FIG. 10

U.S. Patent  Oct. 9, 1990  Sheet 4 of 8  4,961,507
FIG. 9
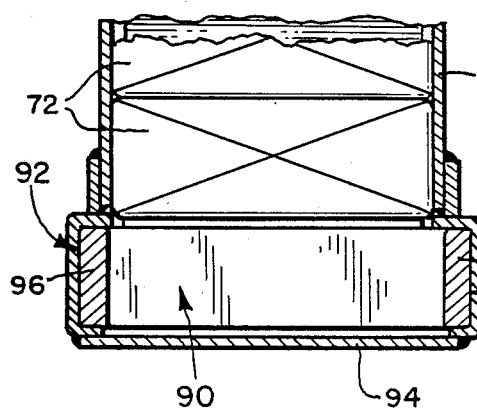
FIG. 8
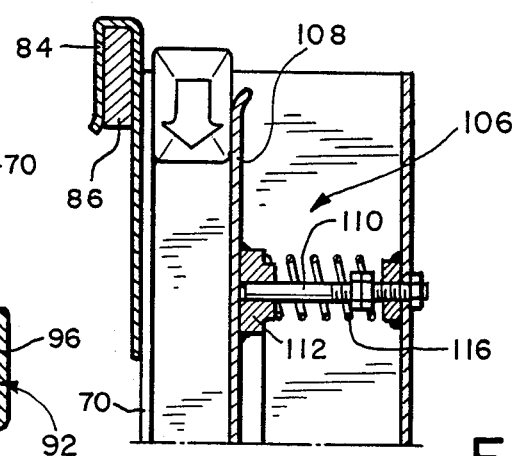
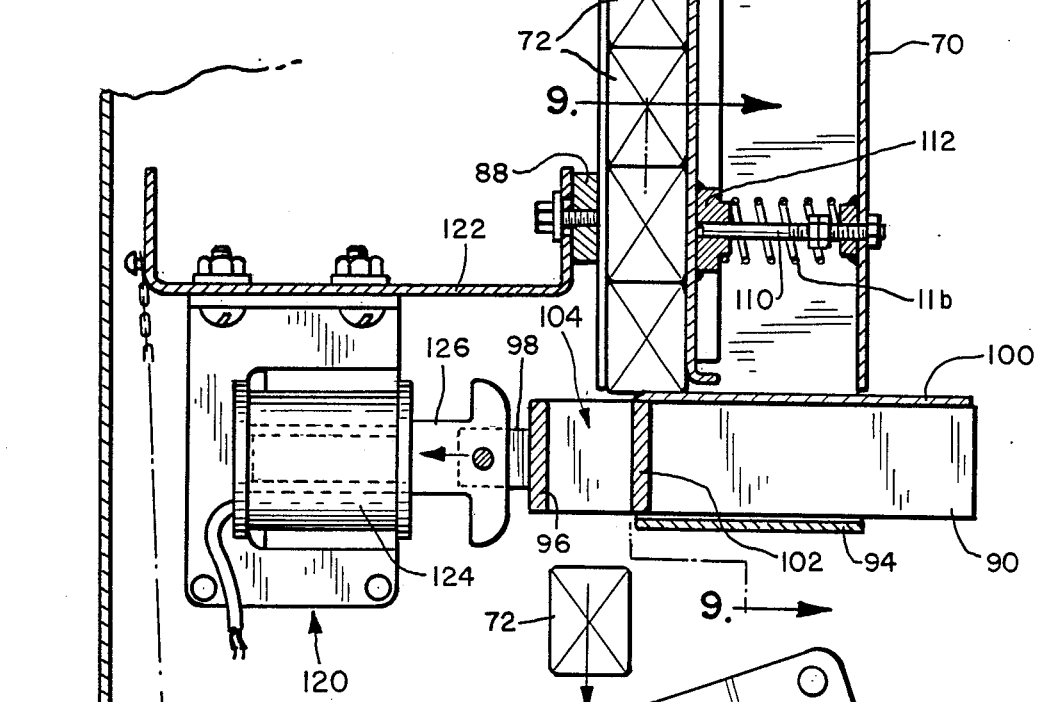
FIG. 8a
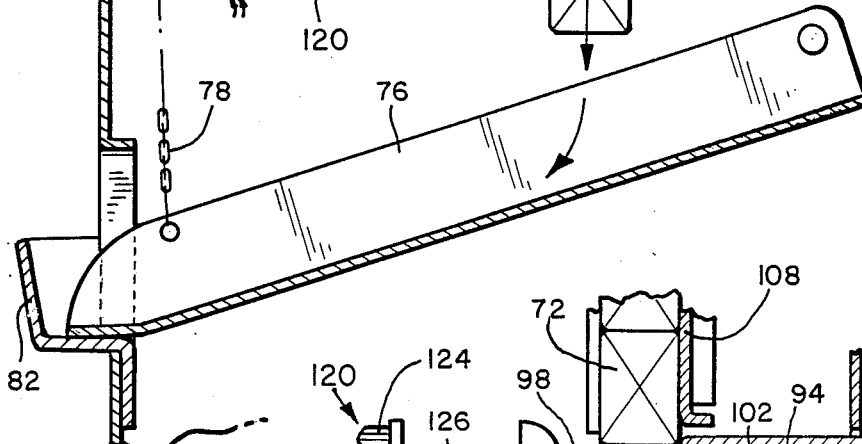

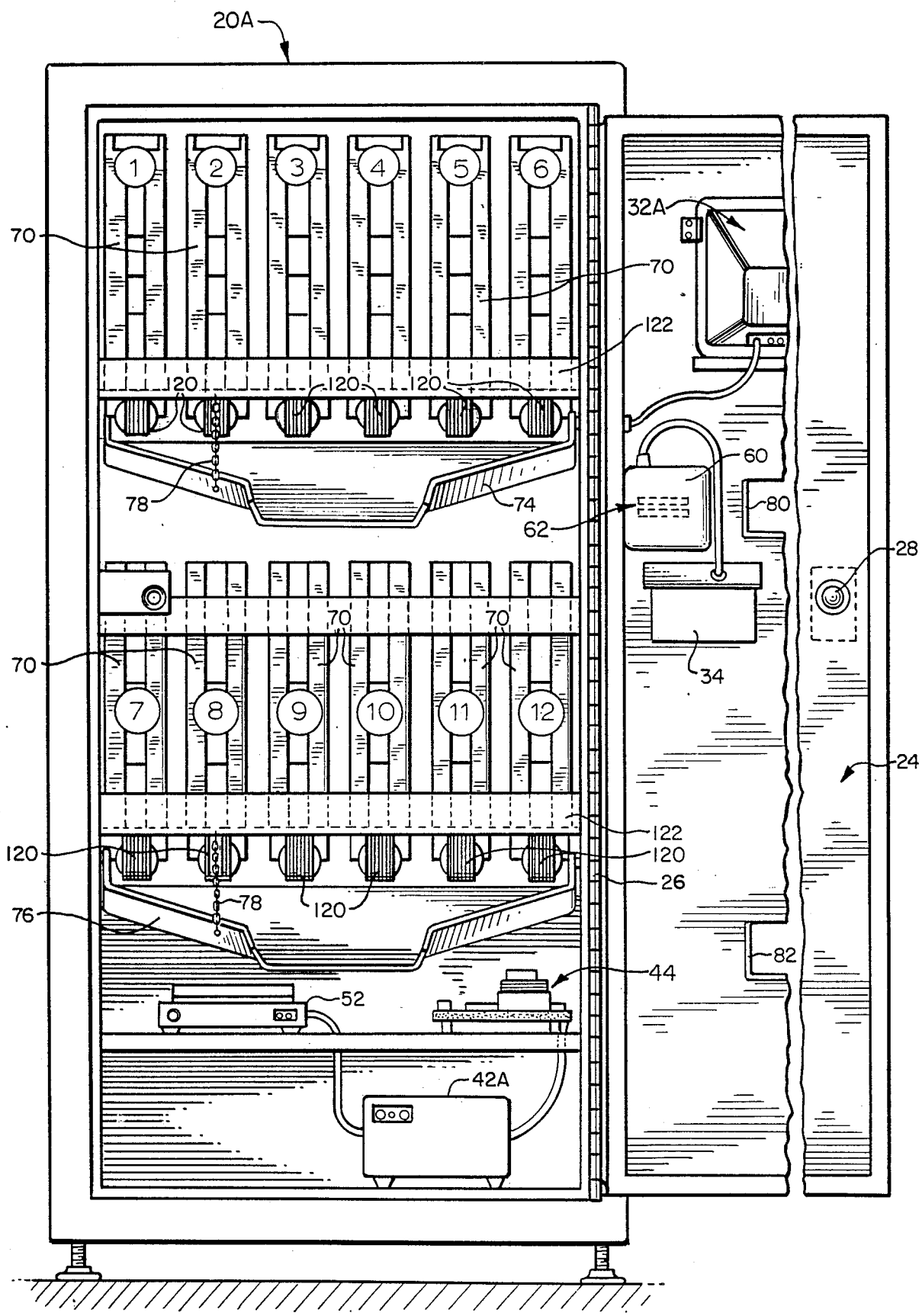

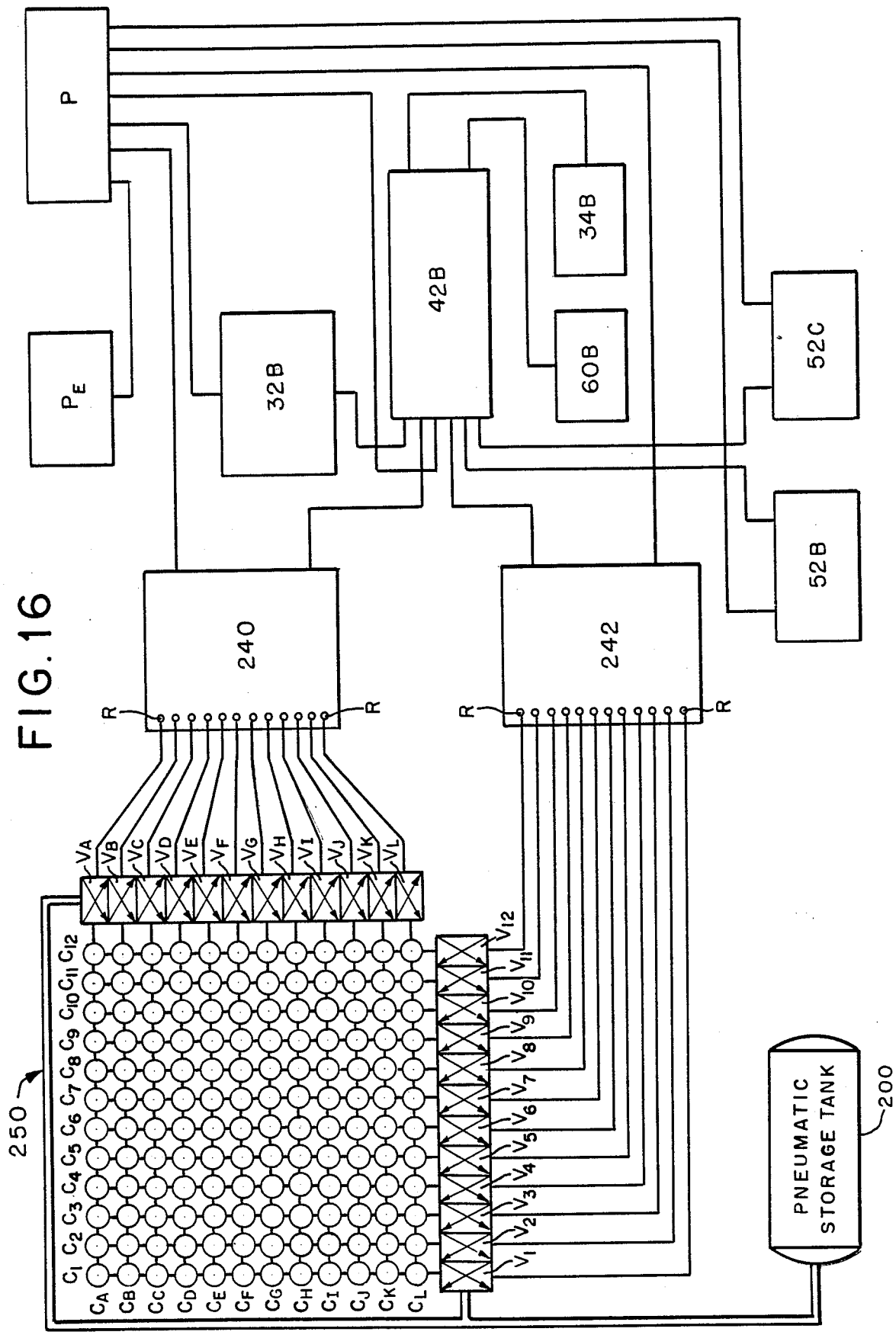

DISPENSING SYSTEM FOR HANDLING CONSUMABLE TOOLING AND SUPPLIES

BACKGROUND OF THE INVENTION

This application is a continuation of application Ser. No. 06/932,930 filed on Nov. 19, 1986, now abandoned which is a continuation-in-part of application Ser. No. 06/756,340 filed on July 17, 1985, now abandoned.

This invention relates generally to a method and a system for handling consumable items, tooling and supplies, and more particularly relates to a machine, system and method which controls the dispensing, ordering, restocking, inventorying and recording of the end use of such consumable items.

The typical manufacturing or other facility utilizes many consumable tools and supplies for each operating shift. These items, which can take the form of drugs, tool inserts, drill bits, welding rod, gloves and a host of other items, are difficult and expensive to inventory, dispense, restock, reorder and track to their end use. At the present time, the handling of such consumable items is extremely labor intensive. Usually, a manufacturing or other facility maintains one or more cribs or supply depots or supply rooms which contain an inventory of the many items, tools or supplies which will be needed in the facility. Such tool cribs or supply depots are expensive to supply and maintain because of the cost of the parts themselves; the cost of the space needed to maintain the crib or depot and store the parts; and the labor needed to control the inventory, reorder and restock the items, and dispense the items on a controlled basis.

Increased competition in all forms of manufacturing operations and other facilities has created a strong need and desire to provide a system or method which would substantially reduce the costs associated with the inventorying, dispensing, restocking, reordering and tracking the end use of such consumable items in a manufacturing or other facility. The method and apparatus for handling tooling and supplies in accordance with the present invention meets this need by eliminating a tool crib or other central location for storing and dispensing the items, tools and supplies. The labor and overhead costs associated with these prior tool crib or supply depots are thereby substantially reduced or eliminated. By utilizing the system, apparatus and method of this invention, items, tooling, supplies and other consumable items are dispensed throughout a manufacturing facility on a much more rapid and efficient basis than possible with prior systems. This invention also provides for controlled access to the item, tool or supply dispensing operation, so that unauthorized personnel cannot utilize the system. The invention provides an automatic inventory control and creates a record of the use of the items dispensed and used. The present system also allows the use of consignment methods of handling the items, tooling and supplies, so that major reductions in inventory costs can be realized.

SUMMARY OF THE INVENTION

The system and method in accordance with this invention places a uniquely designed dispensing machine at one or more selected locations in the manufacturing or other facility. The machine is located in close proximity to the work area where the consumable items, tools and supplies are needed to perform the daily manufacturing operations. The expensive time lost in transporting workers, items, tools and supplies between work stations and tool cribs or supply depots is thereby substantially reduced. The items, tools and supplies contained in each machine are selected to meet the needs of the particular work station. Each machine can be stocked with a single item, or can be supplied with a plurality of different items, depending on the needs of the users.

In one embodiment of the machine, a pneumatic system including matrix switching is used to control the dispensing of the selected items. The matrix switching system substantially reduces the number of component parts needed for the dispensing system, and thereby substantially reduces the size of the machine and the costs related to both the initial machine construction and maintenance.

In accordance with this invention, each unique dispensing machine can operate as a stand-alone machine, or can function as a component of an integrated network which controls the item, tool and supply inventory and dispensing operation for the entire factory or other facility. In large manufacturing facilities this networked system could include a main frame computer or other central processing unit which would be programmed with the up-to-date inventory data for the parts and supplies to be utilized.

One embodiment of the system in accordance with this invention also includes a program and a data base which can be programmed and utilized to identify all authorized personnel who have access to the dispensing machine, whether the machine is a stand-alone or networked machine. Each machine in this embodiment includes a user identification device, such as card reader, which is coupled to the processing unit provided in the system. This card reader can receive a card with encoded data, and will transmit the coded identification of the user into the machine program. The system then functions to automatically record this information in the memory of the central processing unit associated with the system.

Each dispensing machine further includes an input device such as a keyboard which allows the user to enter the necessary data to identify and order the item, tooling or supplies needed from the machine. A special application computer, preferably of the single board type, is provided in each machine so that the operation of the keyboard identifies the components in the machine, responds to commands to order a particular component, and can automatically adjust the inventory of the dispensed component in the machine memory.

The machines are easily converted into a networked system which can collect data from a plurality of machines and adjust the inventory for all or part of the operations of the manufacturing or other facility. The program provided in the special application computer in each machine is variable, so that the machine can be set up and programmed to dispense different types of items in the same or a different manufacturing facility.

The system thereby provides controlled access to the machines, efficient tool and supply dispensing and restocking, and accurate inventory control and updating. The system in accordance with this invention permits the elimination of a central tool crib or supply depot, and is adapted to allow the inventory in each machine to be provided by a tool or parts supplier on a consignment basis.

The system and method of this invention provides the above-described machine having a supply of consumable items with a memory and a program to select the items to be dispensed. Means are provided to enter data to select the item and to transmit the data to the machine memory. The machine then dispenses the selected item. The data stored in the machine memory can then be used to control the ordering, inventorying and tracking of the use of the consumable items dispensed from the machine. The system can also be programmed to identify and record the authorization of the machine user. The system allows each machine to be periodically restocked with replacement items in a manner which does not interfere with the basic operation of the manufacturing facility. No pneumatic control system including matrix switching allows the machine to be expanded to handle a large number of items efficiently and economically.

BRIEF DESCRIPTION OF THE DRAWINGS

Further objects and features of this invention will become more apparent from the following description of illustrative embodiments of the invention, taken in conjunction with the accompanying drawings in which:

FIG. 6 is an enlarged and removed partial sectional view of one of the magazines positioned within the machine to store and dispense selected tooling or supply items;

FIG. 7 is an enlarged and removed view in partial section of the ejection mechanism incorporated in the machine to eject a selected item from each of the storage magazines as shown in FIG. 6:

FIG. 8 is an enlarged sectional side view taken along the line 8—8 in FIG. 5 showing the relationship between the magazines and ejection mechanisms incorporated into the machine near the final stage of the dispensing operation;

FIG. 8a is an enlarged sectional side view of the magazine and ejection mechanism shown in a return and charging stage of the dispensing operation;

FIG. 9 is a front sectional view of the magazine and ejection mechanism as viewed along the line 9—9 in FIG. 8;

FIG. 10 is a top view in partial section of the dispensing machine illustrating the arrangement for movably mounting a monitor within the machine;

FIG. 11 is a front view of a modified dispensing machine in accordance with this invention;

FIG. 16 is a schematic representation of the control system included in the pneumatic dispensing machine shown in FIGS. 13 and 14 and illustrating the configuration and operation of the matrix switching system in accordance with this invention.

DESCRIPTION OF THE ILLUSTRATIVE EMBODIMENTS

Figure 1:
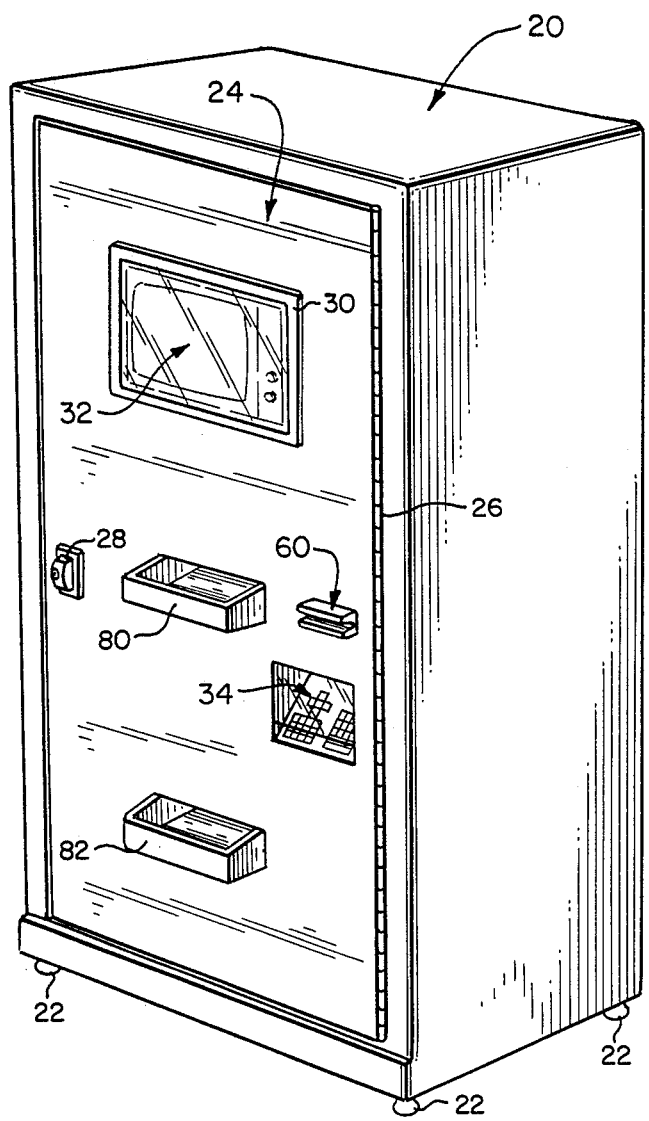
FIG. 1 is a front perspective view of a machine for dispensing consumable tools and supplies in accordance with the present invention.

A dispensing machine for use in the system and method for handling consumable items such as tooling and supplies in accordance with this invention is indicated by the reference numeral 20 in FIG. 1. The machine 20 comprises an enclosed cabinet made from sheet steel or other suitable material which can be positioned at a selected station within a manufacturing facility. In accordance with this invention, one or more of these machines 20 are located in stations which are in the proximity of the end user of the items, tools or supplies to be dispensed by the machine. Adjustable support legs 22 allow the machine 20 to be supported in a level position. A movable front panel 24 is pivotally attached to the machine 20 by a piano hinge 26 to provide for easy access into the interior of the machine. A locking handle 28 is mounted on the panel 24 on the side opposite the hinge 26 so that access to the interior of the machine can be controlled.

Figure 4:
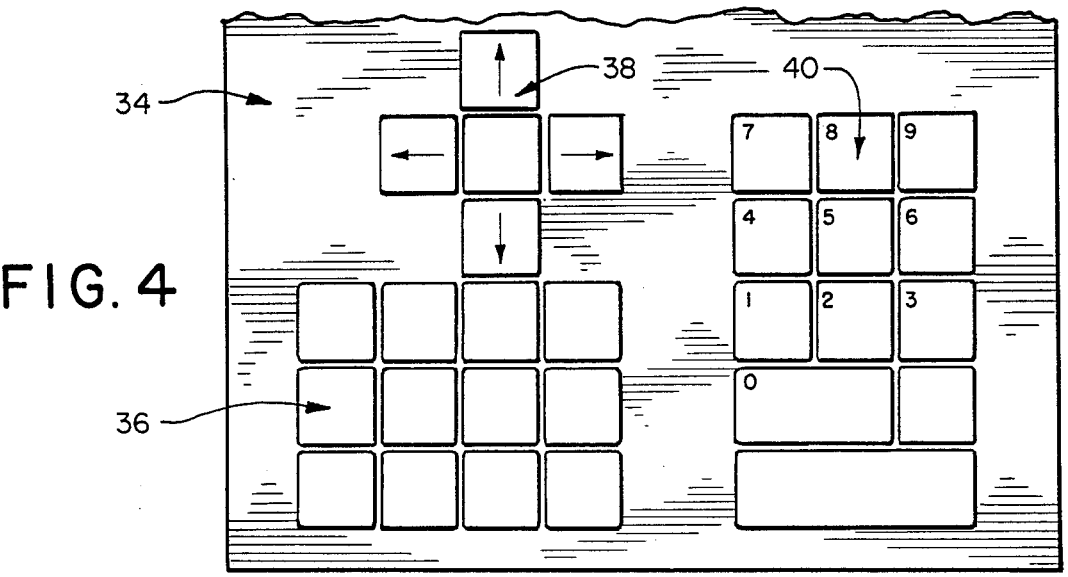
FIG. 4 is an enlarged view of the keyboard incorporated in the machine shown in FIG. 1 for use in identifying and selecting the items to be dispersed.

Referring to FIG. 1 in more detail, the top portion of the front panel 24 includes a transparent viewing window 30 for viewing the monitor or video display play terminal 32 incorporated in the machine 20. The central portion of the panel 24 includes a keyboard 34 interconnected with the monitor 32. The keyboard 34 is thereby positioned for easy access by the user of the machine. The types of keys typically provided on the keyboard 34 are illustrated by the enlarged view of the keyboard shown in FIG. 4. Function keys 36 are provided to perform the various functions of the program incorporated into the system of this invention. Cursor arrow keys 38 are also provided to allow the user of the machine to move the cursor to the desired position on the monitor 32 during the operation of the system. A numerical key pad 40 similarly allows the entry of numerical data into the computer during system operation.

Figure 5:
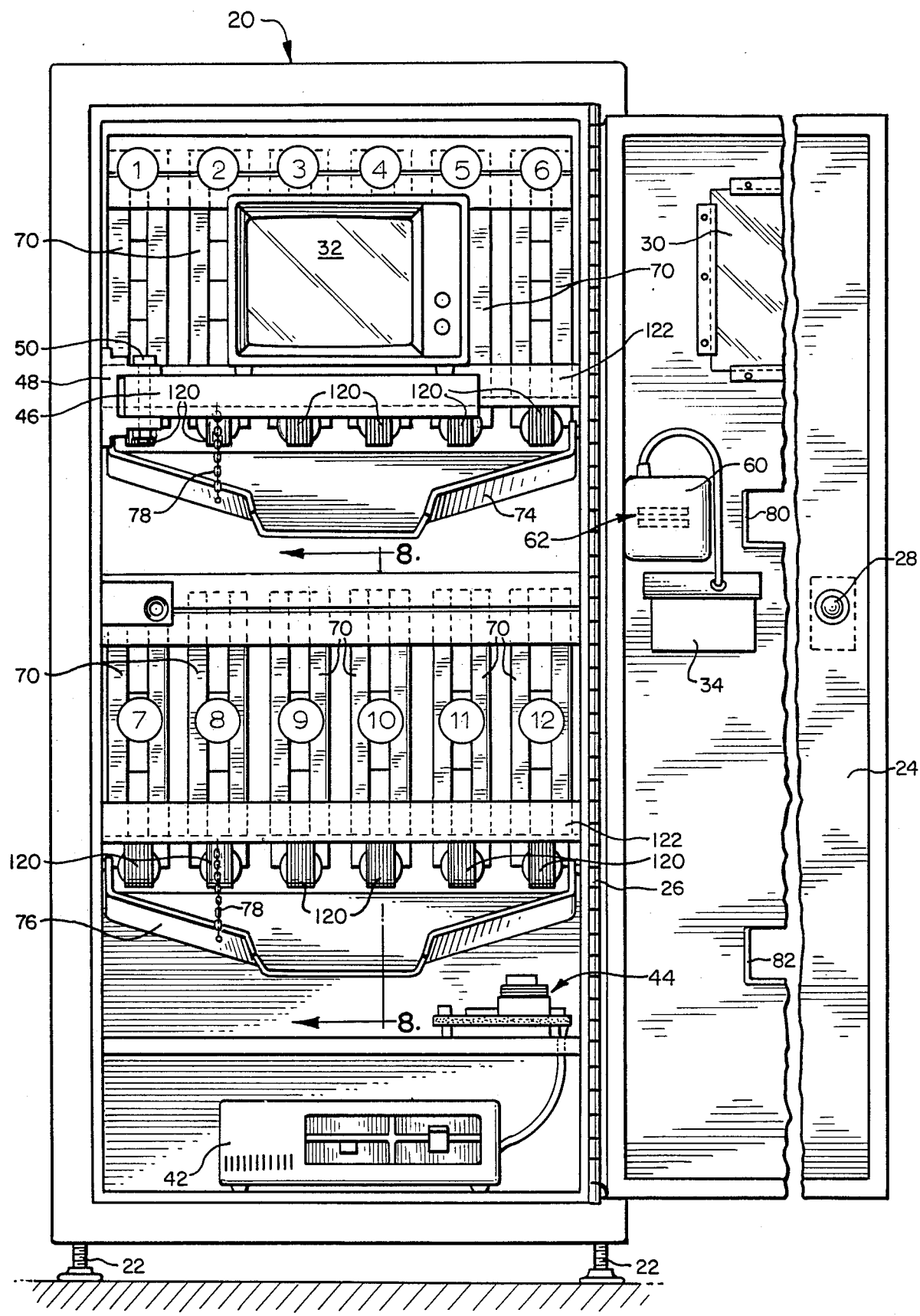
FIG. 5 is a front view of the machine in FIG. 1 shown in an opened condition to illustrate the internal components of the machine.

A full view of the computer monitor 32 is shown in FIG. 5. The provision and location of the central processing unit (CPU) 42 of the computer is also illustrated in FIG. 5. The CPU 42 can be an IBM PC or other suitable standard computer unit, or can be a unit that is scaled down and custom made to perform only the computer functions needed in the dispensing system in accordance with this invention. A power source 44 is incorporated in the machine to drive the computer system including the CPU 42, the monitor 32 and the keyboard 34.

The embodiment of the machine 20 illustrated in FIGS. 5 and 10 includes a rotatably shelf 46 for supporting the computer monitor 32. As shown in FIGS. 5 and 20, a mounting bracket 48 and pivot pin 50 support the shelf 46 so that the monitor 32 can be pivoted between an inner and an outer location. In the inner location, as shown in FIG. 5 and shown in solid lines in FIG. 10, the monitor 32 is aligned with the viewing window 30. In the outer position, as shown in dotted lines in FIG. 10, the shelf 46 supports the monitor 32 in an outward position so that access can be gained to other internal components of the machine 20.

A modified embodiment of the machine 20A is shown in FIG. 11. The parts of the machine 20A are the same as in the machine 20 except for the computer system components. In the machine 20A the monitor 32A is reduced in size and mounted on the front panel 24. Also the CPU 42A is illustrated as a custom-designed unit which is substantially reduced in size and cost compared to the standard CPU 42. This embodiment of the machine 20A further includes a printer 52, positioned in the lower portion of the machine. The printer 52 is interfaced with the CPU 42A and other components of the computer system to provide for a hard copy printout of the data generated by the use of the machine 20A.

Figure 2:
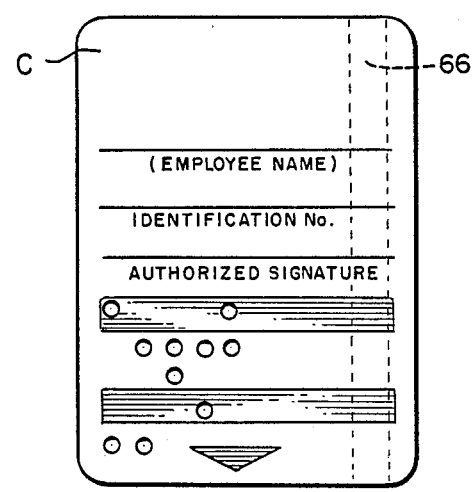
FIG. 2 is a top view of a user identification card which can be utilized with the dispensing machine shown in FIG. 1.
Figure 3:
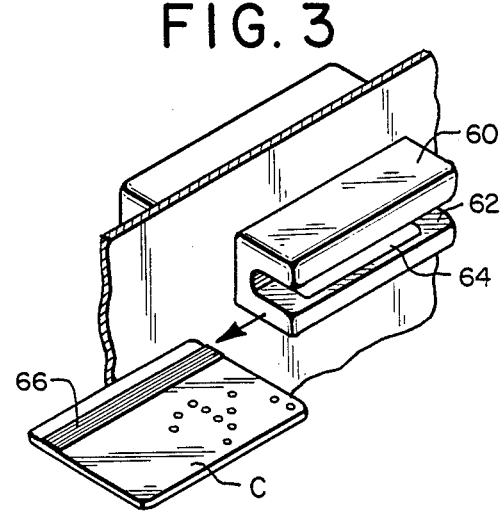
FIG. 3 is a removed perspective view of a card reader incorporated into the machine shown in FIG. 1 for use in reading the data presented on the user card illustrated in FIG. 2.

As shown in FIG. 3, each embodiment of the machine 20 and 20A in accordance with this invention is adopted to be provided with an identification card reader 60. The reader 60 is mounted on the front panel 24 and defines a reading slot 62. The slot 62 includes a magnetic head 64 which is capable of reading the encoded data carried on the magnetic strip 66 of a user identification card C. As shown in FIGS. 2 and 3, the card C is designed to be provided to each authorized user of the machines 20 or 20A, and is very similar to identification cards currently in use in many manufacturing facilities. The reader 60 is interfaced with the keyboard 34, the CPU 42 or 42A and the other components of the computer system to identify the machine user and allow access to the machine only to authorized personnel. A suitable reader 60 for performing these functions is a fixed head type reader available from TPS Electronics, Inc., 4047 Transport St., Palo Alto, Calif. 94303.

As shown in FIGS. 5 and 11, each machine 20 or 20A includes twelve storage and dispensing magazines 70. In the illustrated embodiments each of the magazines 70 is identical in construction and is designed to store and dispense generally rectangular boxes of inserts 72, as seen in FIG. 8. If desired, a single machine 20 can be adapted to dispense a plurality of different items by substituting magazines of different size for one or more of the common magazines 70. Such a machine which is adapted to dispense a large number of items which can differ in size and shape is illustrated in FIGS. 13-16 by the machine 20B, as further described hereinbelow.

Six of the magazines 70, numbered 1 through 6 in FIGS. 5 and 11, form an upper bank of magazines which dispense items into a common upper collection chute 74. Six other magazines 70, numbered 7 through 12 in FIG. 8, form a lower bank of magazines which dispense items into a common lower collection chute 76. Support chains 78 or the like maintain the chutes 74 and 76 in the proper position below the related magazines 70. As shown in FIG. 1, the front panel 24 of the machine 20 or 20A includes an upper dispensing trough 80 aligned to receive the items collected and dispensed from the upper chute 74. In the same regard, the front panel 24 also includes a lower dispensing trough 82 aligned to receive the items collected and dispensed from the lower chute 76.

Each of the magazines 70 is removably mounted within the machine 20 or 20A in a manner that permits the magazines to be changed to suit the particular needs of the machine users. To accomplish this arrangement each magazine 20 includes a hanger bracket 84 fixed, such as by welding, to the top of the magazine. A pair of struts 86 extend across the interior of the machine 20 in the upper and lower portions of the machine and are adapted to receive the hanging brackets 84. A pair of braces 88 extend in a similar fashion across the upper and lower portions of the machine interior in positions parallel to the struts 86. As shown in FIGS. 6 and 8, the magazines 70 abut against and are held in the proper position by the braces 88 when the magazines are hanging from the supporting struts 86.

As shown in FIGS. 6 through g, the lower end of each dispensing magazine 70 is provided with a discharge tray 90. The tray 90 is slidably mounted within opposed channels 92 formed in a bottom member 94. The bottom member 94 in turn is fixed to the lower end of the magazine 70. The tray 90 is formed from a bifurcated slide 96 which is provided with an apertured extension 98 at the front end. A support plate 100 is positioned on the slide 96 and is firmly supported at the front end by a brace 102 extending across the bifurcated slide. The plate 100 and the brace 102 are spaced from the front end of the slide 96 to form a discharge opening 104 of a predetermined size in the slide 96. As seen in FIGS. 8 and 8a, the purpose of the opening 104 is to allow the items 72 to be discharged downwardly into the chute 76 during the operation of the machine 20 or 20A. Thus, the size of the opening 104 is selected to accommodate the item 72 being dispensed. The slide 96 will be replaced with a slide having an opening of a different dimension when the machine is adapted to dispense items of different shapes or sizes.

Each plate 100 is designed to support the column of items 72 stored in the magazine 70 as the lowermost item 72 is being dispensed into the adjacent chute 74 or 76. As shown in FIG. 8, the discharge tray 90 is therefore positioned adjacent the bottom end of the magazine 70 so that the plate 100 catches and supports the second-lowest item 72 as the lowest item is being discharged. As also shown in FIGS. S and 8a, the bottom member 94 is positioned at the lower end of the magazine 70 to extend below the column of items 72 a sufficient distance to support the column. It has been found that sufficient support for the column of items 72 is provided if the member 94 extends below approximately one half of the column.

Each magazine 70 also includes a springloaded pusher assembly 106 which is designed to maintain the items 72 in an aligned vertical column to facilitate the dispensing operation. This assembly 106 comprises an elongated pusher shoe 108 which abuts against the items 72. The shoe 108 is maintained in a vertical position within the magazine 70 by a pair of horizontal mounting pins 110. The outer end of each pin 110 is slidably supported in an aperture in the magazine 70, as seen in FIG. 8. The inner end of each pin 110 is fixed to a boss 112 attached to the rear of the shoe 108. A compression spring 114 extends between the magazine 70 and the shoe 108 along each pin 110 in abutment with the adjacent boss 112. These springs function to bias the shoe 108 inwardly (to the left in FIG. 8) against the items 72 in the magazine 70. The pins 110 are adjustable so that the force of the shoe 108 on the items 72 is sufficient to maintain the items in a vertical column in a manner that will not interfere with the dispensing of the items from the magazine during the operation of the machine 20.

The actuation of the discharge tray 90 in the machines 20 and 20A is controlled by a solenoid assembly 120. As shown in FIGS. 5 and 11, one solenoid assembly 120 is provided adjacent the lower end of each magazine 70 in the machine 20 or 20A. A pair of channel-shaped mounting bars 122 extend across the interior of the machine 20 or 20A to support these solenoid assemblies 120. As seen in FIG. 8, the mounting bars 122 are bolted to the transverse braces 88 positioned within the machine.

The solenoid assembly 120 can be hydraulic, pneumatic or electrical, depending upon the needs of a particular application. In the illustrated embodiments shown in FIGS. 1 through 12, the solenoid assemblies 120 are electrically actuated, and thereby include a coil 124 and an armature plunger 126. As described further below, the dispensing system in the machine 20B illustrated in FIGS. 13-16 is pneumatically controlled.

Each solenoid plunger 126 in the machines 20 and 20A is attached to the extention 98 on the front end of the associated discharge tray 90. The actuation of the solenoid assembly 120 thereby causes the tray 90 to slide horizontally through a distance equal to the stroke of the solenoid plunger 126. The solenoid assembly 120 is designed and positioned so that the stroke of the plunger 126 moves the tray 90 a sufficient distance to cause the discharge of the lowermost item 72 through the opening 104 into the associated chute 74 or 76. Such a discharging condition is illustrated in FIG. 8. As shown in FIG. 8a, the return stroke of the solenoid plunger 126 returns the tray 90 to its initial position so that the next item 72 is arranged to be dispensed.

Figure 12:
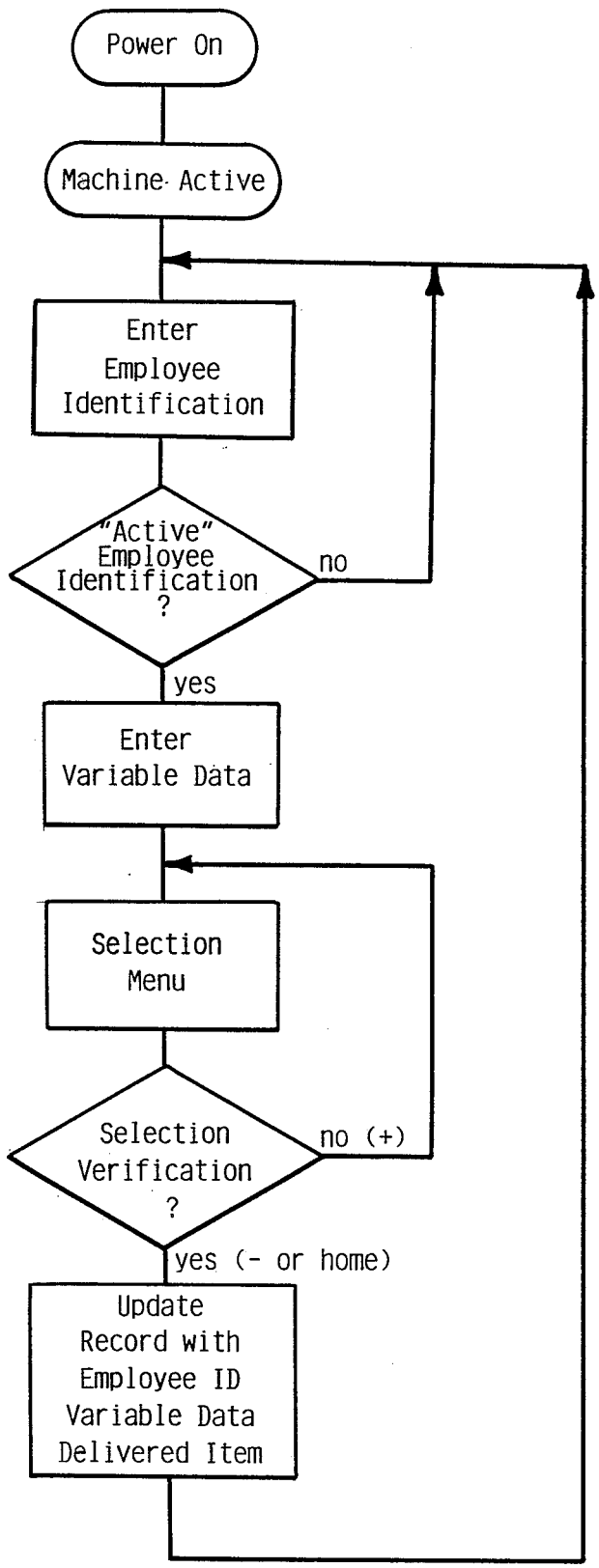
FIG. 12 is a flow chart representing the operation of the program incorporated into the machine shown in FIG. 1 to control the dispensing, ordering, restocking and reordering of the end use of the items stored and dispensed by the machine in accordance with this invention.
Figure 13:
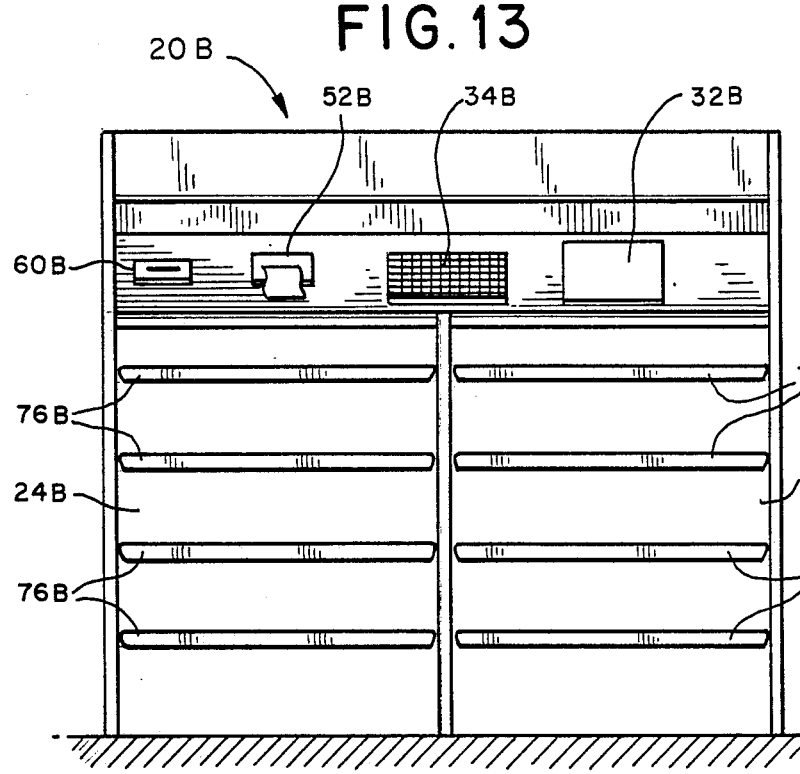
FIG. 13 is a front view of a third embodiment of the machine in accordance with this invention which incorporates a pneumatic control system with matrix switching which adapts the machine for dispensing a large number of items.
Figure 14:
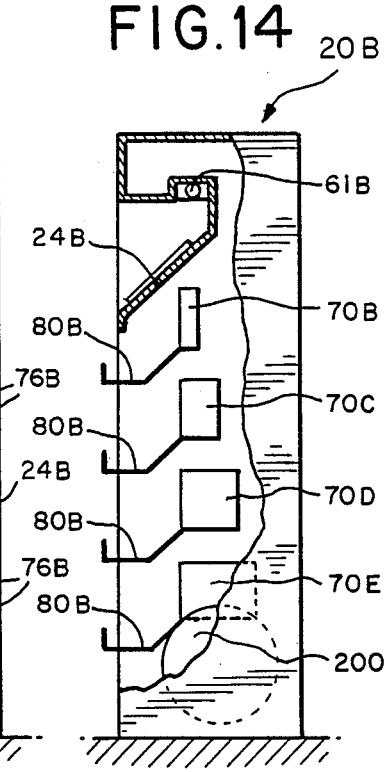
FIG. 14 is a schematic side view of the machine illustrated in FIG. 13.

The general sequence of operation of the machine 20 or 20A in accordance with this invention can be understood by reference to the flow chart set forth in FIG. 12. As indicated by the Power On block in FIG. 12, the computer and other power components of the machine are energized by a suitable switch or the like, not shown. As depicted by the Machine Active block, the machine 20 is thereby activated and the CPU 42 or 42A of the machine computer system is initialized. The machine 20 or 20A is now in condition to begin the dispensing cycle.

In the illustrated embodiments the machines are adapted to identify and verify the authorization of the user. Accordingly, as represented by the Enter Employee Identification block in FIG. 12, the next step in the operation of the system is to insert the employee identification card C into the card reader 60 on the front panel 24 of the machine. The movement of the card C through the card slot 62 causes the magnetic reading head 64 to scan the data provided on the magnetic strip 66 on the card. The software in the machine computer system is programmed to compare the data entered by means of the card C and the reader 60 with an authorized user data base. If the card user is not authorized, a NO message is generated, as indicated in FIG. 12, and the dispensing cycle will not proceed. If a YES message is generated, the operation will be permitted to continue to the Enter Variable Data phase. At this next phase of operation the user employs the keyboard 34 of the machine 20 or 20A and enters preselected data which activates the video display terminal 32. As indicated by the Selection Menu block in FIG. 12, at this point in the cycle a menu identifying the types of items available from the particular machine 20 or 20A is displayed on the terminal 32.

In this Enter Variable Data phase of operation of the system the user enters data through the keyboard 34 which selects an item to be dispensed from the machine. A variety of other appropriate entries are also made, such as data which identifies the part, machine, operation, department and section numbers relating to the selected item. If the item is not available, or if the data was entered incorrectly, a NO message will be generated by the system. As depicted in FIG. 12, the system will then return to the previous phase and display the Selection Menu once again on the terminal 32. On the other hand, if the data is entered correctly and the selected item is available in the machine, a YES signal will be generated by the program, and the operation will proceed. The system continues by generating an electrical signal that activates the solenoid assembly 120 associated with the selected item 72 to be dispensed to the user.

As shown in FIGS. 8 and 8a, the operation of the solenoid assembly 120 moves the plunger 126 and the connected dispensing tray 90 through a predetermined horizontal stroke. As shown by the arrow in FIG. 8, this dispensing stoke draws the lowermost item 72 forward (to the left in FIG. 8) until the item is free from the support of the bottom member 94. The item 72 will then fall into the associated chute 74 or 76 and be presented to the user in the associated dispensing trough 80 or 82. Next, as shown by the arrow in FIG. 8a, the deactivation of the solenoid assembly 120 returns the plunger 126 and the connected dispensing tray 90 to the initial position shown in FIG. 8a. In this position the opening 104 becomes vertically aligned with the column of items 72, so that the next lowermost item 72 drops down into engagement with the bottom member 94. The magazine 70 and the machine 20 are now prepared to repeat the dispensing operation.

As shown in the last block in the flow chart depicted in FIG. 12, the final phase of the operation of the machine 20 comprises the Update of the Record phase. At this point in the cycle, the data base stored in the computer system provided in the machine 20 or 20A, or a data base stored in a central computer system interfaced with the machine, is updated with the data which identifies the user of the machine and item or items that have been dispensed. The system is also programmed so that the entry of such data automatically updates the status of the inventory records relating to the items that were dispensed.

The printer 52 provided in the modified machine 20A shown in FIG. 11 can be used to print a hard copy of the updated information concerning the identification of the machine user, the type and quantity of the items dispensed, and the present status of the inventory for the items dispensed. In addition to or in lieu of such hard copy printouts, the printer 52 can be adapted to generate copies of other documents useful to the user of the machine 20A. For example, the printer 52 can respond to a program to produce a copy of the current blueprint relating to the piece being altered, the tool being used, or other item being dispensed. Job method or procedure cards or the like relating to a selected job can also be produced by the printer 52. The computer system incorporated into the machine 20 can be programmed to produce other documents which are responsive to the needs of the machine user.

The third embodiment of the machine 20B, as illustrated in FIGS. 13–16 is constructed to dispense a large number of items which vary in size and shape. As an example, the machine 20B incorporating the pneumatic dispensing and matrix switching system as illustrated in FIGS. 15–16, is adapted to efficiently and economically dispense up to one hundred and forty-four separate items. Furthermore, the matrix switching system provides the machine 20B with the flexibility to dispense an even larger number of items without the expensive and inefficient duplication of component parts in the pneumatic switching system.

The machine 20B likewise comprises an enclosed cabinet made from sheet steel or other suitable material that can be positioned at a selected location, or at a plurality of locations, within the facility where the items are to be dispensed. Movable front doors 24B are attached to the machine 20B by suitable hinges to provide easy access to the interior of the machine. In this embodiment, a plurality of collection troughs 80B are mounted on the doors 24B and extend below dispensing magazines 70B–E of differing sizes when the doors 24B are closed.

As described with respect to the machines 20 and 20A, the machine 20B includes a front panel 24B for receiving a video display monitor 32B, a keyboard 34B, a printer 52B and a card reader 60B. A light bar 61B also can be provided to illuminate the panel 24B. These components of the machine 20B perform essentially the same operations and perform in substantially the same manner as the same components described above with respect to machines 20 and 20A. As shown schematically in FIG. 14, the machine 20B includes a pneumatic power source and storage tank 200 in its lower portion so that the machine 20B will have a self-contained pneumatic dispensing control system.

As described above with respect to the machines 20 and 20A, each of the dispensing magazines 70B–E in machine 20B comprise a bank of side-by-side magazines, each of which is adapted to dispense a separate item. each magazine 70B–E can be constructed similar to the magazines 70 incorporated into the machines 20 and 20A. However, since it is contemplated that the machine 20B be arranged to dispense up to 144 separate items, the size and shape of the magazines 70B–E will be varied to accommodate the size and shape of the items to be dispensed by a particular magazine. This concept of varying the size and shape of the magazines is illustrated schematically by the varying sizes and shapes of the magazines 70B through 70E shown in FIG. 14.

Figure 15A:
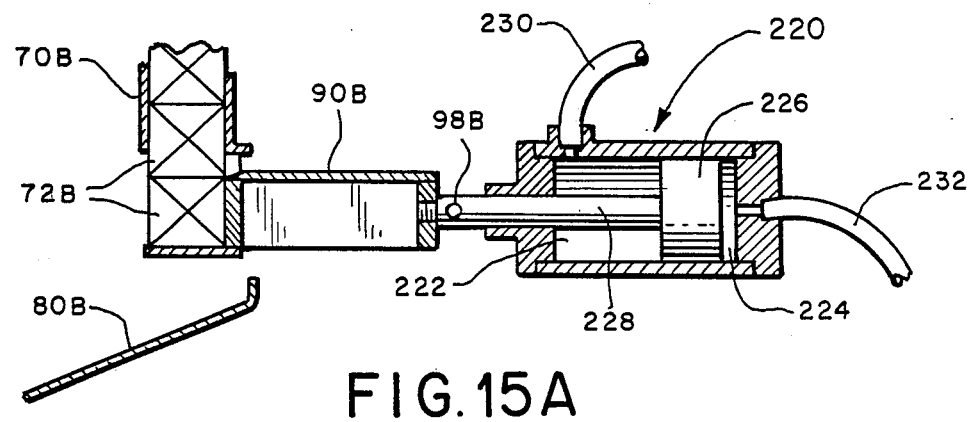
FIG. 15A is a removed partial sectional view of the pneumatic dispensing cylinder included in the machine illustrated in FIGS. 13 and 14 showing the cylinder in the at-rest position before the dispensing operation is begun.
Figure 15B:
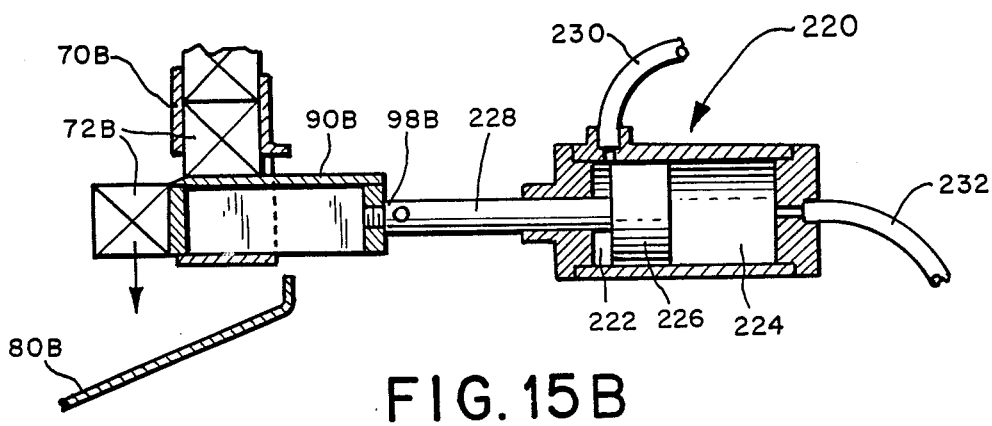
FIG. 15B is a removed partial sectional view of the pneumatic dispensing cylinder of FIG. 15A shown in the actuated position for dispensing a selected item from the machine.

The pneumatic control system embodied in the machine 20B operates in the same manner to dispense an item from the machines regardless of the size or shape of the item. For purposes of illustration, the pneumatic control system components shown in FIGS. 15A and 15B are adapted to actuate each column in the bank of magazines 70B. Again for purposes of illustration, the magazines 70B are shown in FIGS. 15A and 15B to be essentially the same size and shape as the magazines 70 described above with respect to machines 20 and 20A.

As shown in FIGS. 15A and 15B, each magazine 70B is arranged to store and individually dispense items 72B, which are held in a column in the magazine, into the dispensing trough 80B. For purposes of illustration, the components of the magazine 70B are the same as described above for magazine 70, and have been provided with the same reference numerals. However, the discharge tray 90B has been modified in FIGS. 15A and 15B to accommodate the pneumatic control system incorporated into the machine 20B.

More particularly, the tray 90B is formed from a bifabricated slide 96B which is sized and shaped to receive and dispense the items 72B. The tray 90B is further provided with an apertured extension 98B at its rear, rather than at the front as shown in FIG. 8 for the machine 20.

The rearward positioning of the extension 98B on the tray 90B allows the extension 98B to be attached to the pneumatic actuating cylinder 220 which is placed within machine 20B rearwardly of each magazine 70B.

In accordance with this invention, each pneumatic cylinder 220 is a double-acting cylinder which includes a front pressure chamber 222 and a rear pressure chamber 224. A piston 226 connected to a rod 228 divides the chambers 222 and 224. The piston 226 carries a conventional sealing ring (not shown) to pneumatically seal off the chambers 222 and 224 from each other. As shown in FIGS. 15A and 15B, the piston rod 228 is connected to the extension 98B so that the action of the piston rod causes the translational movement of the dispensing tray 90B. Pneumatic lines 230 and 232 are connected to the cylinder chambers 222 and 224, respectively, to apply pneumatic pressure to either the front side (left in FIGS. 15A and B) or back side (right in FIGS. 15A and B) of the piston 226, to thereby cause the piston rod 228 and the tray 90B to be translated during the dispensing operation.

The arrangement shown in FIGS. 15A shows the dispensing machine 20B and the pneumatic cylinder 220 in the dwell condition, where no product such as the item 72B is being dispensed. This condition is maintained by the constant application of pneumatic pressure through the line 230 in the front chamber 222 of the cylinder 220. Such pressure maintains the piston 226 in its dwell position within the cylinder 220, as shown in FIG. 15A. This condition also positions the tray 90B beneath the magazine 70B, and maintains the items 72B in a column in the magazine 70B ready to be dispensed.

FIGS. 15B illustrates the magazine 70B and the pneumatic cylinder 220 in the dispensing condition. To achieve this dispensing condition, the pneumatic pressure in line 230 and front chamber 222 is relieved, and pressure instead is applied to line 232 and in the rear chamber 224. This pressure switching causes the piston 226 and the rod 228 to be actuated forwardly (to the left in FIGS. 15A and B). In turn, the tray 90B is translated forwardly to dispense the lowermost item 72B from the magazine 70B into the dispensing trough 80B. After a selected period of time, the pneumatic pressure in the lines 230, 232 and chambers 222 and 224 is again reversed to recycle the piston 226 and rod 228, as well as the tray 90B, back to the initial dwell position as shown in FIGS. 15A.

FIG. 16 illustrates the matrix pneumatic switching system which selectively actuates the pneumatic cylinders 220 to control the dispensing of the items 72B from the magazines 70B. This system substantially reduces the cost of construction and maintenance of the machine 20B by substantially reducing the number of component parts needed to control the action of each of the plurality of cylinders 220, and provides the machine 20B with flexibiltiy.

The control system for the machine 20B shown in FIG. 16 includes a central processing unit (CPU) 42B which can be an IBM PC or other suitable computer, or an I Buss Computer with its own eprom. The computer 42B includes a video monitor 32B, and operates in the same manner as described above to respond to input from a keyboard 34B. The system further includes an identification card reader 60B which functions in the same manner as the reader 60, described above, to identify the user, and verify that the user is authorized to operate the machine 20B. A thermal printer 52B is also included in the system and is interfaced with the CPU 42B for recording a hard copy printout of the data generated by each use of the machine 20B. An auxillary 80 column printer 52C can also be provided, and interfaced with the CPU 42B to generate a hard copy log or journal of all machine transactions over a selected period, such as daily or weekly reports, or reports of usage since the machine was last stocked.

The control system shown in FIG. 16 also includes a pair of relay boards 240 and 242 which are electrically interfaced or coupled to the CPU 42B. Each board 240 and 242 includes a selected number of electrical relays R of standard construction which are designed to be selectively actuated and to generate an electrical signal in response to the operation of the CPU 42B. Since the illustrated machine 20B is designed to dispense 144 separate items, each relay board 240 and 242 includes twelve relays R, as further explained below.

The pneumatic matrix switching system in accordance with this invention is depicted in FIG. 16 by the grid 250. This grid 250 comprises twelve rows of a selected number of aplha valves which, in the illustrated embodiment, comprise the twelve valves VA through VL as shown in FIG. 16. The grid 250 further includes twelve columns of a selected number of numerical valves which in the illustrated embodiment comprises the valves numbered V1 through V12 in FIG. 16. Each valve VA-L and V1-12 is an electrically actuated two-directional valve which is designed to open or close pneumatic ports in response to an electrical signal. The valves may be designed to avoid any venting to the atmosphere by recycling the air to continued in-line use in the pneumatic system, or may vent to atmosphere at the end of each cycle of operation. As further shown in FIG. 16, each valve is separately electrically connected to one of the relays R on the relay boards 240 and 242. Each valve therefore will be actuated in response to an electrical signal generated by the CPU 42B through the connected relay R.

The grid 250 in accordance with this invention further includes a selected number of pneumatic cylinders C arranged in a matrix of columns and rows. In the illustrated embodiment the grids 250 includes 144 cylinders C arranged in an equal number of twelve rows of alpha cylinders CA through CL, and twelve columns of numerical values C1 through C12. The number of cylinders C in the machine 20B (144) corresponds to the equal number (144) of items capable of being dispensed from the machine. Each cylinder C in FIG. 16 is a double-acting pneumatic cylinder, and is constructed and operates as described above with respect to the cylinder 220 shown in FIGS. 15A and 15B.

All of the alpha cylinders C in each row are pneumatically coupled through a suitable manifold or T-connections (not shown) to each other and to the aligned alpha valve V. Thus, all cylinders in Row CA are pneumatically coupled together and to valve VA; all cylinders in Row CB are coupled together and to valve VB, and so on throughout all rows. Likewise, all numerical cylinders C in each column of the matrix are pneumatically coupled, through a suitable manifold or T-connections (not shown) to each other and to the aligned numerical valve V. Hence, all cylinders in column C1 are coupled together and to valve V1; all cylinders in column C2 are coupled together and to valve V2, and so on.

By this arrangement, the alpha valve VA simultaneously supplies pneumatic power to the entire row of cylinders CA; and the other alpha valves VB-L likewise supplying pneumatic power to the corresponding row of cylinders CB-L. In the same regard, the numerical valve V1 simultaneously supplies pneumatic power to the entire column of cylinders C1; and the remaining numerical valves V2-12 supply pneumatic power to the corresponding column of cylinders C2-12.

As shown in FIG. 16, the column of valves VA-L and the row of valves V1-12 are each connected by suitable fluid lines to a pneumatic power source 200. This power source 200 includes the conventional pneumatic components such as a motor, compressor, regulators, lubricators, pressure switch and tank storage. These components of the pressure source 200 operate in the conventional manner to supply a selected pressure to each valve V1-12 and VA-L in the control system. As stated above, the valves are two-directional valves that may return the air to in-line use to the source 200, or vent to atmosphere, after the selected actuation of the cylinders C.

In accordance with this invention, each valve in one bank of valves, such as the alpha valves VA-L, is normally open, and the other bank, such as the numerical valves V1-12, are closed. Also, each cylinder C in all the columns and rows is normally closed. As described above with respect to FIGS. 15A, the maintenance of the cylinders C (each comprising the cylinder 220 in FIG. 15A) closed maintains the related item 72B in the magazine 70B in condition to be dispensed. This arrangement is accomplished by connecting the normally-open alpha valves VA-L to the forward chamber 222, through the line 230, in each of the cylinders C1-C12 in the related row of cylinders. Also, the normally closed numerical valves V1-12 are connected to the rearward chamber 224 through the line 232, in each of the cylinders CA-L in the related column of cylinders. Thus, the open valves VA-L direct pneumatic pressure to the cylinder chambers 222, and the closed valves V1-12 relieve the pressure in the chambers 224, so that each cylinder C (230 in FIG. 15A) is normally held in the dwell position shown in FIG. 15A.

The electrical components of the system shown in FIG. 16 are powered by a suitable electrical source (not shown) connected to a power supply buss bar P. An auxillary power receptacle PE can also be provided for use with auxillary equipment. Suitable electrical connections, as shown in FIG. 16, couple the other electrical components of the system to the power source through the buss bar P.

The operation of the pneumatic switching system shown in FIG. 16 begins by the insertion of the identification card of the machine user into the card reader 60B. If the user is authorized, he then proceeds to enter the data on the keyboard 34B which identifies the one item 72B out of a selection of 144 items to be dispensed. The computer 42B responds to the keyboard data input by generating an electrical signal to a selected relay R on each relay board 240, 242. As an example, the signal is generated to the uppermost relay R associated with valve VA on the board 240, and to the lowermost relay R associated with the valve V1 on board 242. As explained further below, there is preferably a small, i.e., nanosecond, time delay between the signals, controlled by the computer 42B, so that the signal actuates the valve VA slightly before the valve V1.

As set forth above, the alpha valves, including valve VA, are normally open. When the signal through the relay board 240 actuates valve VA, the valve closes and simultaneously relieves the pressure in the forward chambers 222 in each cylinder 230 in the entire related row of cylinders C1-C12. Each cylinder C1-C12 is thus poised for actuation. Next, with the slight time delay noted above, the signal from the board 242 opens the related normally closed valve V1, so that the pneumatic system attempts to apply pressure in the rearward chamber 224 of every cylinder 230 in the related column of cylinders CA-L. However, since the alpha valves VB-L remain open, the cylinders CB-L in the column related to numeric valve V1 will not be actuated due to a pressure balance between the chambers 222 and 224 in each cylinder. Only the cylinder C1, CA is not so balanced, since the closing of the related valve VA relieved the pressure in the chamber 222 of the cylinder C1, CA.

As a result, the cylinder C1, CA will be actuated and the piston 226 and rod 22B in that cylinder will move forward (to the left in FIG. 15) from the dwell position shown in FIG. 15A into the actuated position shown in FIG. 15B. The attached slide 90B will also be translated to dispense the item 72B from the associated magazine 70B. The dispensed item 72B corresponds to the item selected by the user by the entry of the data on the keyboard 34B.

After a time interval controlled by the computer 42B elapses, the above-described operating sequence is reversed, and the magazine 70B associated with cylinder C1, CA is returned to a condition where it is ready to dispense another item 72B. More specifically, the valve V1 is closed, removing the pressure from the chambers 224 of each cylinder 230 in the column of cylinders CA to CL, including cylinder C1, CA. Then, valve VA is opened, thereby applying pressure to the chambers 222 in each cylinder 230 in the related row of cylinders C1-12, including the cylinder C1, CA. The cylinder C1, CA is thereby returned from the activated and dispensing position shown in FIG. 15B to the dwell condition shown in FIG. 15A.

The above-described operation of valves V1 and VA, and cylinder C1, CA, was stated by way of example. The same operation can be repeated to selectively activate any one of the 144 cylinders C, to dispense one of 144 items, by controlling the operation of the related valves. As a further example, the cylinder C7, CF can be activated by closing the normally-open valve VF and opening the closed valve V7. It will also be apparent that the connections and operation of the banks of alpha and numerical valves can be reversed to accomplish the same purposes.

The pneumatic matrix switching and control system embodied in the machine 20B provides a number of advantages. A substantial cost savings in construction and maintenance of the machine 20B results from the fact that the number of valves V required is only twice the square root of the number of cylinders C and the items to be thereby dispensed. There is also a reduction in the number and size of related items, such as the relay boards 240, 242, as well as the cost and size of the entire machine. Also, the matrix field can be easily expanded or contracted to change the number of items to be dispensed by the machines. For example the addition of two valves, so that each column and row included 13 valves instead of 12, with the addition of a column and row of cylinders C, would increase the dispensing capacity of the machine from 144 items to 169 items, i.e., the square of the number of valves in each column or row. These advantages of matrix switching would accrue from a minimum of 4 cylinders and 2 valves up to any desired number of cylinders (n) and 2 times the square root of (n) valves, i.e., the square root of (n) valves in each column and row.

As set forth above, the machines 20, 20A or 20B can be used as stand-alone machines to dispense single items or a plurality of items at a single location. Alternatively, the machines can be networked to provide a system which allows a variety of items to be available for dispensing to users at a plurality of locations. Also, additional changes and modifications to the machines, methods or systems of this invention can be devised by those skilled in the art without departing from the spirit and scope of the invention as set forth in the accompanying claims.

What is claimed is:

1. A fluid matrix switching system comprising:
   a plurality of fluid cylinders, each cylinder arranged to provide a dispensing stroke and further each having a selected column address and a row address;
   each cylinder being maintained under an initial fluid pressure;
   first actuator means comprising a fluid valve for each column address and connected in common fluid communication to each fluid cylinder having the same column address and operative to condition each cylinder at said column address for actuation;
   second actuator means comprising a fluid valve for each row address and connected in common fluid communication to each fluid cylinder having the same row address and operative to condition each cylinder at said row address for actuation; and
   means to selectively activate one each of said first and second actuator means to condition the cylinders having one column address and one row address for actuating and to activate the cylinder having said one column and said one row address to provide a dispensing stroke.

2. In a machine for separately dispensing a plurality of consumable items, a fluid matrix switching system for controlling the selection dispensing of a selected item comprising:
   a plurality of fluid cylinders corresponding to the types of items being dispensed, with each cylinder arranged to provide a dispensing stroke for each type of item and further each having a selected column address and a row address; each cylinder further providing each magazine with security against unauthorized and inadvertent dispensing by being maintained under an initial fluid pressure;
   first actuator means comprising a fluid valve for each column address and connected in common fluid communication to each fluid cylinder having the same column address and operative to condition each cylinder at said column address for actuation;

second actuator means comprising a fluid valve for each row address and connected in common fluid communication to each fluid cylinder having the same row address and operative to condition each cylinder at said row address for actuation; and means to selectively activate one each of said first and second actuator means to condition the cylinders having one column address and one row address for actuating and to activate the cylinder having in common said one column and said one row address to provide a dispensing stroke which dispenses the associated items.

3. A system in accordance with claim 2 wherein said cylinders comprise pneumatic cylinders and said fluid valves comprise pneumatic valves.

4. A machine in accordance with claim 2, wherein each cylinder comprises a double-acting fluid cylinder which operates to provide a dispensing and return stroke.

5. The machine in accordance with claim 2 further comprising memory means in said machine, said memory means containing data identifying authorized users of the system.

6. A machine in accordance with claim 2 wherein the number of cylinders is 'N', wherein the number of cylinders in each column and row is the square root of 'N'; and further wherein the number of first and second actuator means each comprise the square root of 'N'.

7. A system for dispensing and tracking the use of consumable items comprising:

a dispensing machine having a plurality of magazines each provided with a plurality of consumable items;

a computer system including program means and memory means for a selected number and type of item to be dispensed:

input keyboard means for the system user to enter data in the program to initially select the type and number of the item to be dispensed;

video display means to display to the user the status of the selected item in the system and integrated with the program means to allow the user to vary the initial selection to a final selection;

means for transmitting data identifying the final item selection to the machine memory;

means for generating a dispensing signal;

means operatively connected to each magazine to dispense the selected items in response to a dispensing signal, said dispensing means comprising a fluid cylinder positioned at each magazine to provide each magazine with a dispensing stroke and further having a selected column and row address; each cylinder further providing each magazine with security against unauthorized and inadvertent dispensing by being maintained under an initial fluid pressure;

first actuator means comprising a fluid valve for each column address connected in common fluid communication to each fluid cylinder having the same column address and operative to condition each cylinder having said column address for actuation;

second actuator means comprising a fluid valve for each row address connected in common fluid communication to each fluid cylinder having the same row address and operative to condition each cylinder having said row address for actuation;

means to selectively activate one each of said first and second actuator means to condition the cylinders having one column address and one row address for actuation and to actuate only the cylinder having in common said one column address and said one row address to provide a dispensing stroke which dispenses the item at the associated magazine; and means for outputting the data from the machine memory to control the ordering, inventorying and tracking of the use of the consumable items dispensed from the machine.

8. The system in accordance with claim 7 wherein each magazine includes slide means connected to the adjacent fluid cylinder which responds to the actuation of said cylinder to slide within said magazine and thereby dispense the selected item.

9. A system for dispensing and tracking the use of consumable items comprising:

a machine having a supply of consumable items stored in a plurality of dispensing magazines;

memory means and program means provided for the machine for ordering a selected type and number of the items to be dispensed;

means for the system user to enter data in the program to initially select the type and number of an item to be dispensed;

means to provide the user with data relating the status of the selected item in the system and to allow the user to vary the initial item selection to a final selection;

means for transmitting data identifying the final item selection to the machine memory;

means for dispensing the selected type and number of the item from the machine comprising a plurality of fluid cylinders corresponding to the number of dispensing magazines, with each cylinder arranged to provide a magazine with a dispensing stroke and having a selected column and row address; each cylinder further providing each magazine with security against unauthorized and inadvertent dispensing by being maintained under an initial fluid pressure;

first actuator means comprising a fluid valve for each column address connected in common fluid communication to each fluid cylinder having the same column address and operative to condition each cylinder having said column address for actuation.

second actuator means comprising a fluid valve for each row address connected in common fluid communication to each fluid cylinder having the same row address and operative to condition each cylinder having said row address for actuation;

means to selectively actuate one each of said first and second actuator means to condition the cylinders having one column address and one row address for actuation and to activate only the cylinder having in common said one column address and said one row address to provide a dispensing stroke which dispenses the item at the associated dispensing magazine; and means for outputting the data from the machine memory to control the ordering, inventorying and tracking of the use of the dispensed consumable items.

10. A system in accordance with claim 9 wherein said fluid cylinders comprise pneumatic cylinders and said fluid valves of said first and second actuators comprise pneumatic valves.

11. A system in accordance with claim 9 wherein the number of cylinders is 'N', wherein the number of cylinders in each column and row is the square root of 'N'; and further wherein the number of first and second actuator means each comprise the square root of 'N'.

12. A system in accordance with claim 9 wherein the program means includes a routine which identifies authorized machine users and verifies user authorization before said dispensing means is operable to dispense selected items from the machine.

13. A system in accordance with claim 9, wherein each cylinder comprises a double-acting fluid cylinder which operates to provide both a dispensing and return stroke.

14. The system of claim 9 further comprising means for transmitting data identifying each user to the memory means.

15. A system in accordance with claim 9 including a plurality of said machines positioned at selected dispensing stations to provide a network of dispensing machines and further including a central memory and program means for receiving said output data from each machine memory to control the ordering, inventorying and tracking of the use of the items dispensed from said network.

16. The system in accordance with claim 15 wherein the program means for each machine includes a program routine which identifies authorized machine users; and wherein the system includes means for entering data into the program means of each machine to identify the user and further includes means for verifying the authorization of the user before said dispensing means is operative to dispense the selected item from each machine.

17. A system in accordance with claim 9 wherein the memory means and program means include means for identifying authorized users of the system; and means for entering data in the program identifying the user.

18. The system of claim 17 further comprising logic means for recording and tracking the quantity and type of each item dispensed to each authorized user.

* * * * *

UNITED STATES PATENT AND TRADEMARK OFFICE
CERTIFICATE OF CORRECTION

PATENT NO. : 4,961,507

DATED : October 9, 1990

INVENTOR(S) : Larry G. Higgins

It is certified that error appears in the above-identified patent and that said Letters Patent is hereby corrected as shown below:

In column 6, line 23, please delete "g" and substitute therefor --9--.

In column 6, line 51, please delete "S" and substitute therefor --8--.

In column 10, line 35, please delete "FIGS." and substitute therefor --FIG.--.

In column 10, line 46, please delete "FIGS." and substitute therefor --FIG.--.

In column 10, line 61, please delete "FIGS." and substitute therefor --FIG.--.

In column 13, line 30, please delete "22B" and substitute therefor --228--.

Signed and Sealed this

Twenty-seventh Day of October, 1992

*Attest:*

DOUGLAS B. COMER

*Attesting Officer*   *Acting Commissioner of Patents and Trademarks*